US008248366B2

(12) United States Patent
Mao

(10) Patent No.: US 8,248,366 B2
(45) Date of Patent: Aug. 21, 2012

(54) IMAGE DISPLAY DEVICE AND OPERATION METHOD THEREOF

(75) Inventor: Lu-Kang Mao, Hsinchu (TW)

(73) Assignee: Lite-On It Corp., Taipei (TW)

( * ) Notice: Subject to any disclaimer, the term of this patent is extended or adjusted under 35 U.S.C. 154(b) by 439 days.

(21) Appl. No.: 12/497,602

(22) Filed: Jul. 3, 2009

(65) Prior Publication Data

US 2011/0001697 A1 Jan. 6, 2011

(51) Int. Cl.
*G06F 3/033* (2006.01)

(52) U.S. Cl. ........ 345/157; 345/156; 345/173; 345/174; 178/18.01

(58) Field of Classification Search .......... 345/156–158, 345/173–178; 178/18.01–18.09
See application file for complete search history.

(56) References Cited

U.S. PATENT DOCUMENTS

| | | | | |
|---|---|---|---|---|
| 2002/0098001 | A1* | 7/2002 | Dahl | 396/429 |
| 2003/0210258 | A1* | 11/2003 | Williams | 345/700 |
| 2006/0125843 | A1* | 6/2006 | Chen | 345/619 |
| 2009/0219255 | A1* | 9/2009 | Woolley et al. | 345/173 |
| 2009/0244019 | A1* | 10/2009 | Choi | 345/173 |
| 2009/0256814 | A1* | 10/2009 | Chung et al. | 345/173 |

* cited by examiner

*Primary Examiner* — Amare Mengistu
*Assistant Examiner* — Koosha Sharifi-Tafreshi
(74) *Attorney, Agent, or Firm* — WPAT, PC; Justin King

(57) ABSTRACT

An image display device for displaying digital images includes a display screen, a controller and a proximity sensor in communication with the controller. When an external object such as the user's hand is detected by the proximity sensor, the proximity sensor issues a sensing signal to the controller. The controller controls the display of the digital images in response to the sensing signal. Hence, the display of the digital images can be controlled or operated without touching the image display device.

5 Claims, 2 Drawing Sheets

IMAGE DISPLAY DEVICE AND OPERATION METHOD THEREOF

CROSS REFERENCE TO RELATED PATENT APPLICATION

This patent application is based on a U.S. provisional patent application No. 61/115,919 filed on Nov. 18, 2008, incorporated herein for reference.

FIELD OF THE INVENTION

The present invention relates to an image display device and related operation method, and more particularly to a digital photo frame device to be operated and controlled without touching the digital photo frame device.

BACKGROUND OF THE INVENTION

Following the rapid advancement of digital imaging technology, it is a great tendency that digital cameras almost take the place of the conventional film cameras in the photographic market. Compared with the conventional film cameras, the digital cameras have many magical advantages. For example, the digital camera can display images on a screen immediately after they are recorded. Moreover, the storage capacity of the memory card exceeds the film very much to allow thousands of images to be stored on a single memory card. Furthermore, the user can delete images to free storage space at any time. Besides, the digital images are suitable to be processed by computers cooperating with image processing program.

Except that a small portion of the digital files are printed on smooth papers, most digital photographs are displayed through computers. In this circumstance, digital photo frames are developed to display digital images without the use of the computer. The digital photo frame can receive and show digital files directly from the memory card. Certain digital photo frames have built-in memory device to allow the users to upload pictures to the memory device via a USB connection, or wirelessly via bluetooth technology.

Please refer to FIGS. 1A and 1B respectively illustrating the appearance and a back view of a traditional digital photo frame. The digital photo frame 1 includes a LCD display 12 embedded in an outside frame 11. The digital images are usually displayed on the LCD display 12 in a slideshow with an adjustable time interval. In order to provide the largest view, the buttons 13 for controlling the display of the digital images are usually mounted at the backside of the digital photo frames 1. In addition, a USB port 14 and a memory card slot 15 are provided to allow the digital photo frame 1 to communicate with the digital camera and read digital files from the memory card, respectively. If the digital photo frame 1 supports to play video clips, a speaker 16 is optionally disposed in the digital photo frame 1 to play audio signals.

It is not convenient and user-friendly for the user to press the buttons 13 to control the display of the digital images because the user has to stretch his finger in an unnatural manner to touch the buttons 13 behind the digital photo frame 1. To overcome this problem, the digital photo frame 1 may be designed to be operated by remote control. Remote controls are burdensome because no proper space to place the remote controller so it got lost very often. Another approach is implementing the display 12 with a touch panel or touch pad. Hence, the user can control the display by touching the screen without pressing the buttons behind the digital photo frame. However, using the touch panel significantly increases the cost. Furthermore, after a certain period of use, the user may find ugly fingerprints all over the screen.

Therefore, there is a need of providing an improved digital photo frame to obviate the drawbacks encountered from the prior art.

SUMMARY OF THE INVENTION

The present invention provides an image display device controlled or operated without touching the image display device to prevent from the inconvenient operation or dirtying the display screen.

The present invention also provides a digital photo frame device and an operation method of the digital photo frame device without touching the digital photo frame device.

In accordance with an aspect of the present invention, the image display device includes a display screen, at least one proximity sensor and a controller. The controller is in communication with the display screen and the at least one proximity sensor. The controller converts digital image files into digital images to be shown on the display screen. In addition, the controller controls a display of the digital images in response to a sensing signal issued from the proximity sensor when an external object is detected by the proximity sensor.

In an embodiment, the image display device is a digital photo frame.

In an embodiment, the proximity sensor is an infrared proximity sensor, an inductive proximity sensor, a capacitive proximity sensor or an ultrasonic proximity sensor.

In an embodiment, the proximity sensor is mounted on an outside frame of the display device.

In accordance with another aspect of the present invention, the digital photo frame device includes a display device and a proximity sensor. The display device converts digital image files into corresponding digital images and shows the digital images. The proximity sensor in communication with the display device issues a sensing signal to the display device to control the display of the digital images when an external object is detected by the proximity sensor.

In accordance with a further aspect of the present invention, the operation method includes steps of: performing a display of digital images; issuing a sensing signal when an external object is detected by a proximity sensor; and controlling the display of the digital images in response to the sensing signal.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
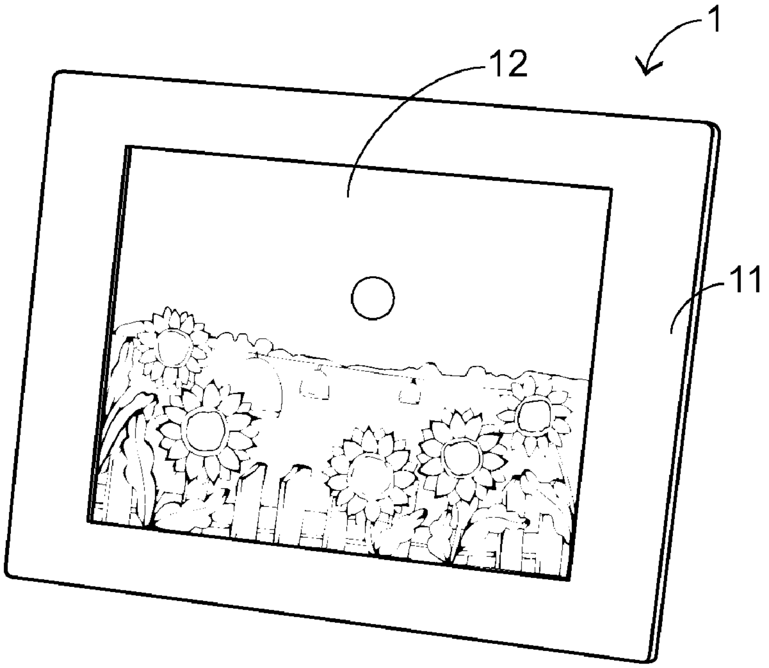
FIG.1A PRIOR ART
FIG. 1A is a schematic view illustrating a conventional digital photo frame.
Figure 1B:
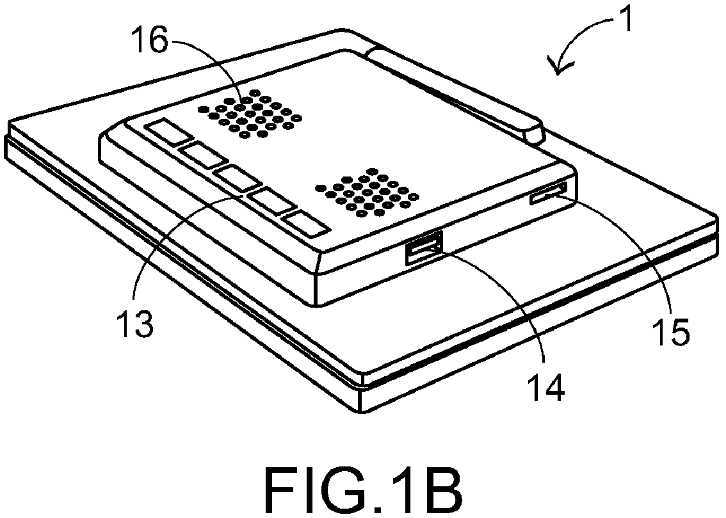
FIG.1B PRIOR ART
FIG. 1B is a schematic view illustrating the back side of the digital photo frame of FIG. 1A.
Figure 2:
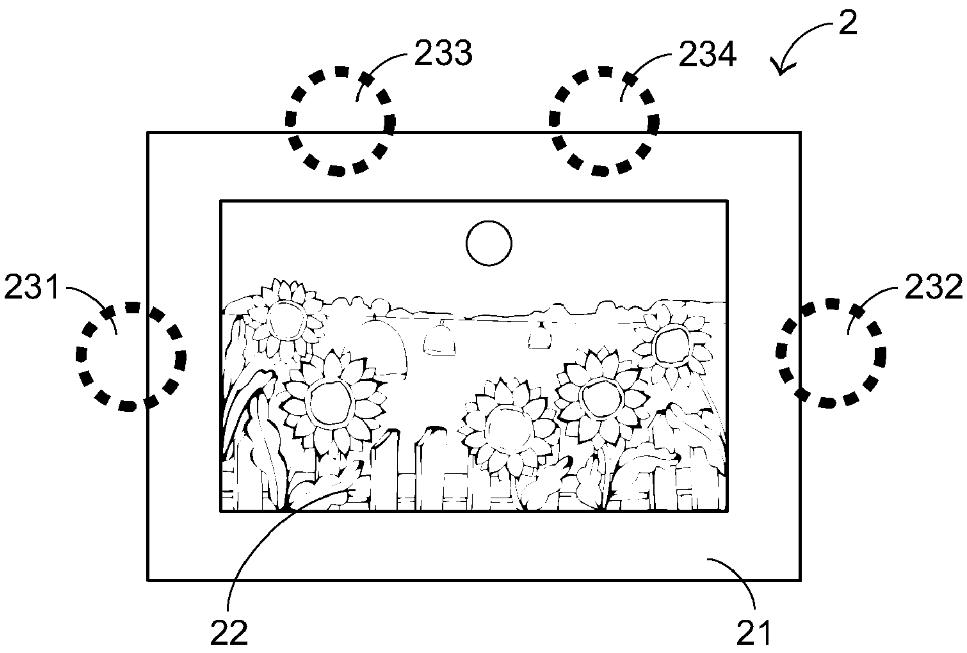
FIG. 2 is a schematic view illustrating a digital photo frame according to the present invention.

Please refer to FIG. 2 illustrating a digital photo frame according to the present invention. The digital photo frame 2 includes a display 22 embedded in an outside frame 21. The user sees digital images through the display 22. In one embodiment, four proximity sensors are mounted on the outside frame 21 of the digital photo frame 2. Two of them are mounted on the top side and the other two are mounted at opposite lateral sides. The proximity sensors 231~234 can detect the presence of nearby objects without any physical contact. Hence, the user can control or operate the display of the digital images on the display 22 by motion of his hand. In other words, the user may pass his hand within the nominal range (effective range) of the proximity sensor(s) 231~234 or remains his hand close enough to the proximity sensor 231~234 for a while to shield the proximity sensor(s) 231~234. The effective distance of the proximity sensors is usually several centimeters. The proximity sensors may be implemented by infrared proximity sensors, inductive proximity sensors, capacitive proximity sensors and ultrasonic proximity sensors. Thus, the control needs not touch the digital photo frame 2, neither buttons nor display screen.

Figure 3:
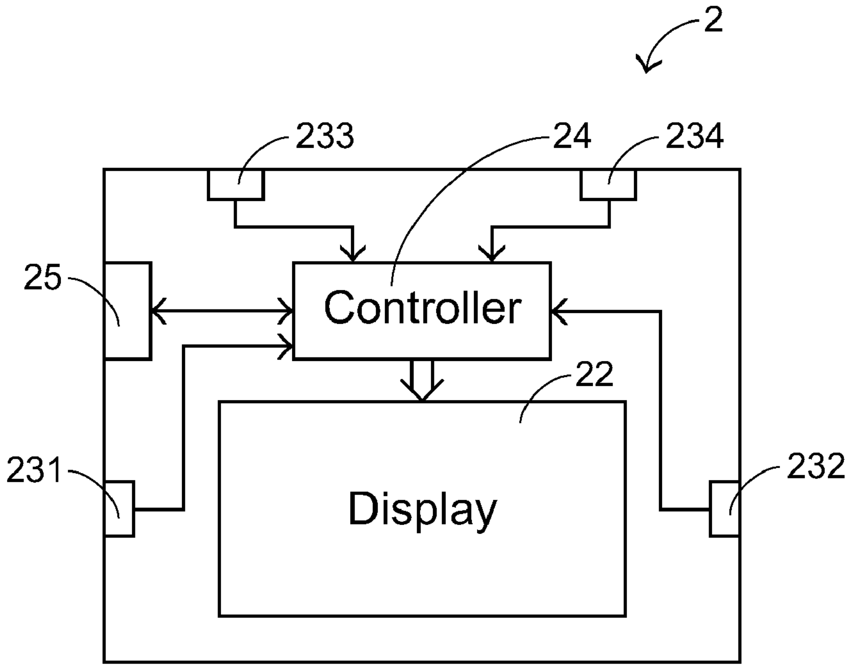
FIG. 3 is a circuit block diagram of the digital photo frame of FIG. 2.

The proximity sensors 231~234 sense approaching and moving of the user's hand to generate sensing signals. Please refer to FIG. 3 illustrating a circuit block diagram of the digital photo frame 2. A controller 24 is electrically connected to the display 22 and the proximity sensors 231~234. The controller 24 receives the sensing signals of the proximity sensors 231~234 and issues corresponding control signals to achieve the control of the display mode of the digital photo frame 2. Furthermore, a USB port 25 electrically connected to the controller 24 may be provided to allow possible communication with other devices.

The operation of the digital photo frame 2 is full of diversification. For example, if the user passes his hand from left to right on the top side of the digital photo frame 2, the proximity sensors 233 and 234 detect the presence of the external object at different time points and respectively issue sensing signals to the controller 24. The controller 24 judges that an object is moving along the designated direction upon receiving the two sensing signals, one followed another within a predetermined time interval, so decide to launch a picture browser. In another example, the user can place his hand on the right side of the digital photo frame 2 to shield the right proximity sensor 232 in order to move the cursor on the display 22. The right proximity sensor 232 issues a sensing signal to inform the controller 24 while detecting an external object. Then, the controller 24 generates a control signal in response to the sensing signal to move the cursor toward the preferred album or image. When the cursor reaches the preferred album or image, the user removes his hand from the right proximity sensor 232 to stop the moving of the cursor. A slideshow from the selected picture starts by passing the hand from left to right on the top side of the digital photo frames 2 again. If the right proximity sensor 232 is shielded for a longer time, the cursor will move faster. Besides, the images can be navigated in playback mode by shielding the left proximity sensor 231.

It is to be noted that the operation is not limited to the examples given above. All the possible operation provided by conventional buttons or remote controller such as "play", "stop", "select", "move to previous" and "jump to next" function can be controlled via one proximity sensor or combination of proximity sensors. Even the settings of the display can be adjusted by this method. The words "top", "left", and "right" in the description are used for illustrate the present invention, but are not exclusive. The number of the proximity sensors can be increased or decreased according to the applications. Besides, the user may use arbitrary object to approach the proximity sensor(s) to perform operation of the digital photo frame.

In addition to the digital photo frame, the present invention can be applied to other image display device, for example monitor or display screen of tablet PC or notebook computer. Easy operation such as using a picture browser to navigate digital images needs not complicated input device such as keyboard or mouse. Hence, the user can put his hand close to the proximity sensor(s) mounted on the image display device to operate or control the display of the digital images in a quite convenient manner.

From the above embodiment, since the image display device or the digital photo frame is touch-less, fingerprint is not an issue anymore. Remote controller is not needed, either. The drawbacks of the prior arts are therefore overcome.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An operation method of a digital photo frame device including at least one proximity sensor, comprising steps of:

performing a display of digital images;

shielding a proximity sensor located on a lateral side of the digital photo frame device;

issuing a sensing signal when an external object passing through an effective range of two proximity sensors within a predetermined time interval is detected;

moving a cursor shown on the digital photo frame device in a specific direction during the shielding step to select one of the digital images;

controlling the display of the digital images in response to the sensing signal; and starting a picture browser.

2. The operation method according to claim 1 wherein the external object is the user's hand.

3. The operation method according to claim 1 wherein the cursor is moved faster when the proximity is shielded longer.

4. The operation method according to claim 1, further comprising steps of: passing the external object through the effective ranges of two proximity sensors located on the top side of the digital photo frame device within a predetermined time interval; and displaying a slideshow starting from the selected one of the digital images.

5. The operation method according to claim 1, further comprising a step of displaying a slideshow in a reverse direction when a specific proximity sensor is shielded.

* * * * *